US012706298B2

(12) United States Patent
Kim et al.

(10) Patent No.: US 12,706,298 B2
(45) Date of Patent: Aug. 11, 2026

(54) ALL-SOLID LITHIUM SECONDARY BATTERY AND PREPARATION METHOD THEREOF

(71) Applicant: LG ENERGY SOLUTION, LTD., Seoul (KR)

(72) Inventors: Tae Gon Kim, Daejeon (KR); Dong Chan Lee, Daejeon (KR); Jeong Beom Lee, Daejeon (KR); Sul Cham Kim, Daejeon (KR); Hye Jin Kwon, Daejeon (KR); Hoe Jin Hah, Daejeon (KR); Ki Tae Kim, Daejeon (KR); So Hee Kim, Daejeon (KR); Jeong Gil Kim, Daejeon (KR); Myeong Soo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 506 days.

(21) Appl. No.: 18/037,301

(22) PCT Filed: May 27, 2022

(86) PCT No.: PCT/KR2022/007605
§ 371 (c)(1),
(2) Date: May 16, 2023

(87) PCT Pub. No.: WO2022/250505
PCT Pub. Date: Dec. 1, 2022

(65) Prior Publication Data

US 2024/0021785 A1 Jan. 18, 2024

(30) Foreign Application Priority Data

May 28, 2021 (KR) ........................ 10-2021-0069414

(51) Int. Cl.
*H01M 4/133* (2010.01)
*H01M 4/134* (2010.01)
(Continued)

(52) U.S. Cl.
CPC ........... *H01M 4/133* (2013.01); *H01M 4/134* (2013.01); *H01M 4/1393* (2013.01); *H01M 10/0525* (2013.01); *H01M 10/0562* (2013.01)

(58) Field of Classification Search
CPC .... H01M 4/133; H01M 4/134; H01M 4/1393; H01M 10/0525; H01M 10/0562;
(Continued)

(56) References Cited

U.S. PATENT DOCUMENTS 9,096,431 B2 * 8/2015 Wee ....................... H01G 11/36
2008/0220329 A1 9/2008 Kojima et al.
(Continued)

FOREIGN PATENT DOCUMENTS

CN 109314225 A 2/2019
CN 111656573 A 9/2020
(Continued)

OTHER PUBLICATIONS

The Decision of KPO to grant a Patent for Application KR 20220065665 (Year: 2025).*
(Continued)

*Primary Examiner* — Alexander Usyatinsky
(74) *Attorney, Agent, or Firm* — Bryan Cave Leighton Paisner LLP

(57) ABSTRACT

The present disclosure relates to an all-solid lithium secondary battery and a preparation method thereof, wherein the all-solid lithium secondary battery includes a positive electrode active material layer, a negative electrode active material layer, and a solid electrolyte layer disposed between the positive electrode active material layer and the negative electrode active material layer, wherein the negative electrode active material layer includes a carbon structure and silver nanoparticles, the carbon structure includes a structure in which a plurality of graphene sheets are connected to each
(Continued)

other, and the plurality of graphene sheets include two or more graphene sheets having different plane directions.

14 Claims, 9 Drawing Sheets

(51) Int. Cl.
*H01M 4/1393* (2010.01)
*H01M 10/0525* (2010.01)
*H01M 10/0562* (2010.01)

(58) Field of Classification Search
CPC ........ H01M 4/366; H01M 4/38; H01M 4/587; H01M 4/626; Y02P 70/50; Y02E 60/10
See application file for complete search history.

(56) References Cited

U.S. PATENT DOCUMENTS

| | | | | |
|---|---|---|---|---|
| 2011/0223480 | A1 | 9/2011 | Wee et al. | |
| 2017/0352868 | A1 | 12/2017 | Zhamu et al. | |
| 2018/0145317 | A1 | 5/2018 | Momma et al. | |
| 2019/0157723 | A1* | 5/2019 | Suzuki ............. | H01M 10/0562 |
| 2019/0198916 | A1 | 6/2019 | Yoon et al. | |
| 2020/0335794 | A1 | 10/2020 | Kim et al. | |
| 2021/0151741 | A1 | 5/2021 | Zhamu et al. | |
| 2021/0210791 | A1 | 7/2021 | Suzuki et al. | |
| 2022/0158192 | A1 | 5/2022 | Kim et al. | |
| 2023/0187705 | A1 | 6/2023 | Suzuki et al. | |
| 2024/0047761 | A1 | 2/2024 | Suzuki et al. | |

FOREIGN PATENT DOCUMENTS

| | | | |
|---|---|---|---|
| EP | 3716289 | A1 | 9/2020 |
| JP | H11-329442 | A | 11/1999 |
| JP | 2012-502467 | A | 1/2012 |
| JP | 2018088400 | A | 6/2018 |
| JP | 2019096610 | A | 6/2019 |
| JP | 2021508156 | A | 2/2021 |
| KR | 10-2008-0022494 | A | 3/2008 |
| KR | 10-2008-0111809 | A | 12/2008 |
| KR | 10-1937900 | B1 | 1/2019 |
| KR | 10-2019-0079132 | A | 7/2019 |
| KR | 10-2083543 | B1 | 2/2020 |
| KR | 10-2020-0078479 | A | 7/2020 |
| KR | 10-2020-0107740 | A | 9/2020 |
| KR | 10-2020-0107872 | A | 9/2020 |
| KR | 10-2021-0045858 | A | 4/2021 |

OTHER PUBLICATIONS

Lee et al.,(2020), High-Energy Longcycling All-Solid-State Lithium Metal Batteries Enabled by Silver-Carbon Composite Anodes, Nature Energy, vol. 5, pp. 299-308.

Habazaki et al., (2006) High Rate Capability of Carbon Nanofilaments with Platelet Structure as Anode Materials for Lithium Ion Batteries, Electrochemistry Communications, vol. 8, No. 8, pp. 1275-1279.

Wang et al, "Raman Spectroscopy of Carbon Materials: Structural Basis of Observe Spectra", Chemistry of Materials, Sep. 1, 1990, pp. 557-563, xp055179622, DOI: 10.1021/cm00011a018.

Wu et al. (2018) "Raman spectroscopy of graphene-based materials and its applications in related devices", Chemical Society Reviews, vol. 47, No. 5, pp. 1822-1873, XP093411030.

* cited by examiner

ALL-SOLID LITHIUM SECONDARY BATTERY AND PREPARATION METHOD THEREOF

CROSS-REFERENCE TO RELATED APPLICATIONS

This application is a National Phase entry pursuant to U.S.C. § 371 of International Application No. PCT/KR2022/007605, filed on May 27, 2022, and claims the benefit of and priority to Korean Patent Application No. 10-2021-0069414, filed on May 28, 2021, the disclosures of which are incorporated by reference in their entirety for all purposes as if fully set forth herein.

TECHNICAL FIELD

The present disclosure relates to an all-solid lithium secondary battery and a preparation method thereof.

BACKGROUND

Secondary batteries have been mainly applied to the area of small-sized devices such as mobile device and notebook computer, but their application direction has recently been extended to the area of medium and large-sized devices, for example, the area requiring high energy and high output such as energy storage system (ESS) and electric vehicle (EV).

Recently, interest in an all-solid lithium secondary battery tends to increase. The all-solid lithium secondary battery is a secondary battery using a non-flammable inorganic solid electrolyte instead of a liquid electrolyte, wherein the all-solid lithium secondary battery is attracting attention in that it has higher thermal stability than a lithium secondary battery using the liquid electrolyte, has a very low risk of explosion due to leakage during overcharge, and is not required to add equipment for preventing the explosion risk.

However, since the all-solid lithium secondary battery uses a rather bulky solid electrolyte, there are many attempts to improve energy density of the battery. For this purpose, a metal layer capable of forming an alloy with lithium, such as lithium metal, is used as a negative electrode active material layer. However, if the metal layer is used, since pores are generated between the solid electrolyte and the metal layer while lithium precipitated on the metal layer is ionized and dissolved, it adversely affects battery operation. Also, since lithium metal is precipitated as dendrites on a surface of the metal layer during discharge of the all-solid lithium secondary battery, lifetime and safety of the all-solid lithium secondary battery are degraded.

In order to solve such a problem, conventionally, a method of applying a high external pressure by disposing an end plate for preventing the generation of the pores on a positive electrode or negative electrode is also used. However, since a volume of the all-solid lithium secondary battery is excessively increased when the end plate applying the external pressure is used, there is a problem in that the energy density of the all-solid lithium secondary battery is reduced.

Thus, there is a need for a new method capable of improving the lifetime and safety of the all-solid lithium secondary battery.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE OF THE INVENTION

Technical Problem

An aspect of the present disclosure provides an all-solid lithium secondary battery in which lithium metal may be effectively stored by reducing lithium ions during charge, initial charge/discharge efficiency may be improved, and life characteristics may be improved.

Another aspect of the present disclosure provides an all-solid lithium secondary battery having price competitiveness by reducing an amount of silver nanoparticles used.

Another aspect of the present disclosure provides a method of preparing the above-described all-solid lithium secondary battery.

Technical Solution

According to an aspect of the present disclosure, there is provided an all-solid lithium secondary battery including a positive electrode active material layer, a negative electrode active material layer, and a solid electrolyte layer disposed between the positive electrode active material layer and the negative electrode active material layer, wherein the negative electrode active material layer includes a carbon structure and silver nanoparticles, the carbon structure includes a structure in which a plurality of graphene sheets are connected to each other, and the plurality of graphene sheets include two or more graphene sheets having different plane directions.

According to another aspect of the present disclosure, there is provided a method of preparing an all-solid lithium secondary battery which includes: a first step of forming dry mixed powder including a carbon structure and silver nanoparticles disposed on the carbon structure by reducing silver ions in a mixture of the silver ions and the carbon structure; and a second step of forming a negative electrode active material layer on a negative electrode collector through a negative electrode mixture including the dry mixed powder.

Advantageous Effects

With respect to an all-solid lithium secondary battery according to the present disclosure, since a negative electrode active material layer includes a carbon structure and silver nanoparticles which are described in the present specification, lithium ions are reduced and precipitated by the negative electrode active material layer during charge, and thus, the lithium ions may be effectively stored in a negative electrode. Also, since the stored lithium may be dissolved in the form of lithium ions during discharge, the lithium ions may move to a positive electrode. The carbon structure may improve initial charge/discharge efficiency and life characteristics of the battery by increasing mobility of the lithium ions. Furthermore, as the carbon structure is used, since the above-described lithium ions may effectively move even with the use of a low amount of the silver nanoparticles, price competitiveness of the all-solid lithium secondary battery prepared may be increased.

DETAILED DESCRIPTION

Figure 1:
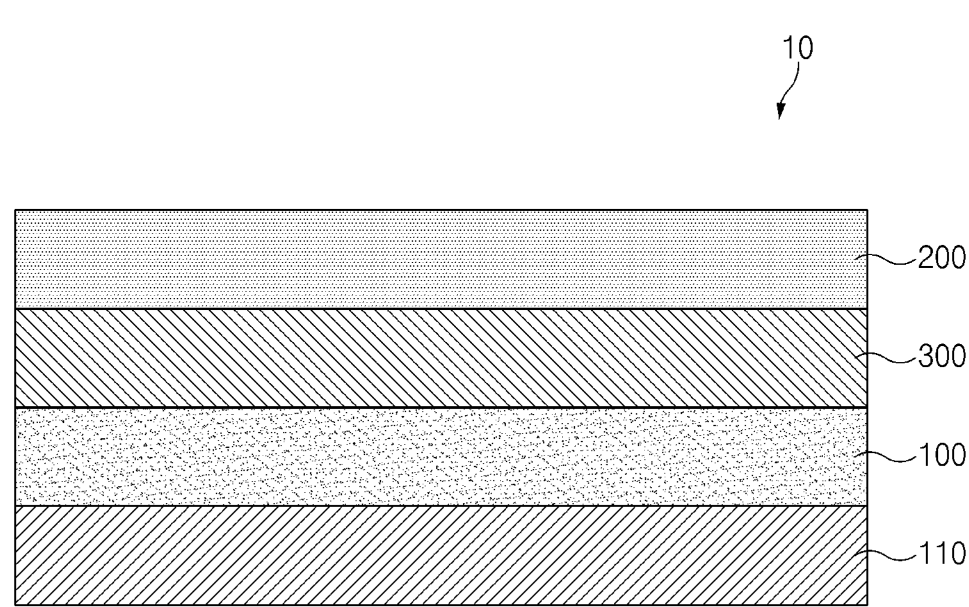
FIG. 1 is a schematic diagram for explaining an all-solid lithium secondary battery according to an embodiment of the present disclosure.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present disclosure. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

$I_D/I_G$ (ratio) of the present specification may be measured from a wavelength-peak graph during Raman spectrum measurement. Specifically, after fitting the graph by setting a base line so that a D peak and a G peak may be distinguished, the $I_D/I_G$ may be identified by dividing D peak intensity by G peak intensity (using built-in software, NRS-2000B, Jasco). In the Raman spectrum, a G peak near 1590 $cm^{-1}$ is due to $E_{2g}$ vibration mode of $sp^2$ bonds of carbon, and a D peak near 1350 $cm^{-1}$ appears when there is a defect in the $sp^2$ bonds of carbon.

An average thickness of graphene sheets in a carbon structure in the present specification is an average value of thicknesses of 100 graphene sheets when the prepared carbon structure or the carbon structure of a negative electrode active material layer is observed at ×1,000,000 magnification with a transmission electron microscope (TEM).

An average lateral size of the graphene sheet in the carbon structure in the present specification is an average value of lateral sizes of 100 graphene sheets when the prepared carbon structure or the carbon structure of the negative electrode active material layer is observed at ×250,000 magnification with a TEM. Herein, the lateral size denotes the longest length when assuming a line from one point to another point in one graphene sheet.

An average particle diameter of silver nanoparticles in the present specification corresponds to an average value of particle diameters of 100 silver nanoparticles when the prepared carbon structure including the silver nanoparticles or the carbon structure including the silver nanoparticles of the negative electrode active material layer is observed at ×1,000,000 magnification with a TEM.

An oxygen content of the carbon structure in the present specification may be measured by carbon (C), hydrogen (H), oxygen (O), and nitrogen (N) elemental analysis.

Hereinafter, the present disclosure will be described in detail.

All-Solid Lithium Secondary Battery

An all-solid lithium secondary battery according to an embodiment of the present disclosure includes a positive electrode active material layer, a negative electrode active material layer, and a solid electrolyte layer disposed between the positive electrode active material layer and the negative electrode active material layer, wherein the negative electrode active material layer includes a carbon structure and silver nanoparticles, the carbon structure includes a structure in which a plurality of graphene sheets are connected to each other, and the plurality of graphene sheets may include two or more graphene sheets having different plane directions.

(1) Negative Electrode Active Material Layer

The all-solid lithium secondary battery may include a negative electrode active material layer. Specifically, the all-solid lithium secondary battery may include a negative electrode, and the negative electrode may include a negative electrode collector and a negative electrode active material layer.

The negative electrode collector is not particularly limited so long as it has conductivity without causing adverse chemical changes in the battery. For example, copper, stainless steel, aluminum, nickel, titanium, fired carbon, or aluminum or stainless steel that is surface-treated with one of carbon, nickel, titanium, silver, or the like may be used as the negative electrode collector. Specifically, a transition metal that absorbs carbon well, such as nickel or stainless steel metal, may be used as the negative electrode collector.

Referring to FIG. 1, the negative electrode active material layer 100 may be disposed on at least one surface of the negative electrode collector 110. Specifically, the negative electrode active material layer 100 may be disposed on one surface of the negative electrode collector 110, or alternatively, may be disposed on both surfaces of the negative electrode collector (not shown).

The negative electrode active material layer may include a carbon structure and silver nanoparticles. Specifically, the negative electrode active material layer may be composed of a carbon structure and silver nanoparticles.

1) Carbon Structure

The carbon structure may act as a movement path for lithium ions transferred from the positive electrode active material layer to be easily precipitated and stored on the negative electrode collector.

The carbon structure may include a structure in which a plurality of graphene sheets are connected to form a secondary particle. Specifically, in the secondary particle, at least two graphene sheets may be directly connected to each other or may be indirectly connected. More specifically, the secondary particle has a form in which a portion of one graphene sheet is connected to a portion of another graphene sheet adjacent thereto.

In the carbon structure, the plurality of graphene sheets may be interconnected to form a secondary particle in the form of a chain, and, more specifically, the secondary particle in the form of a chain may partially include an aggregated region of the plurality of graphene sheets. Since the carbon structure has a unique direct connection structure in the form of a chain, a robust network capable of improving electrical conductivity and ionic conductivity may be formed. Accordingly, storage and movement of lithium ions may be significantly improved.

Figure 4:
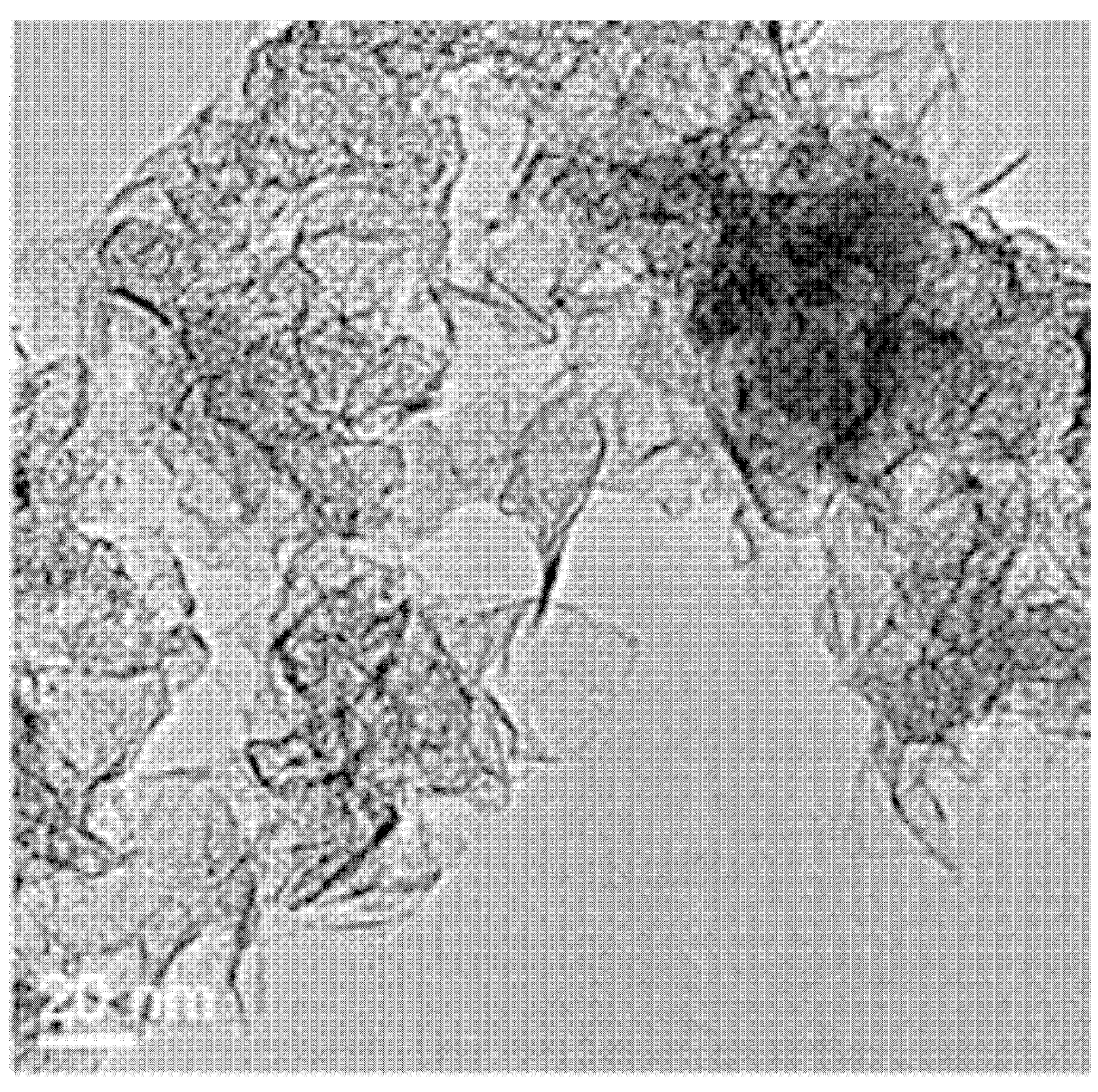
FIG. 4 is a transmission electron microscope (TEM) image of the carbon structure mentioned in the present disclosure.
Figure 5:
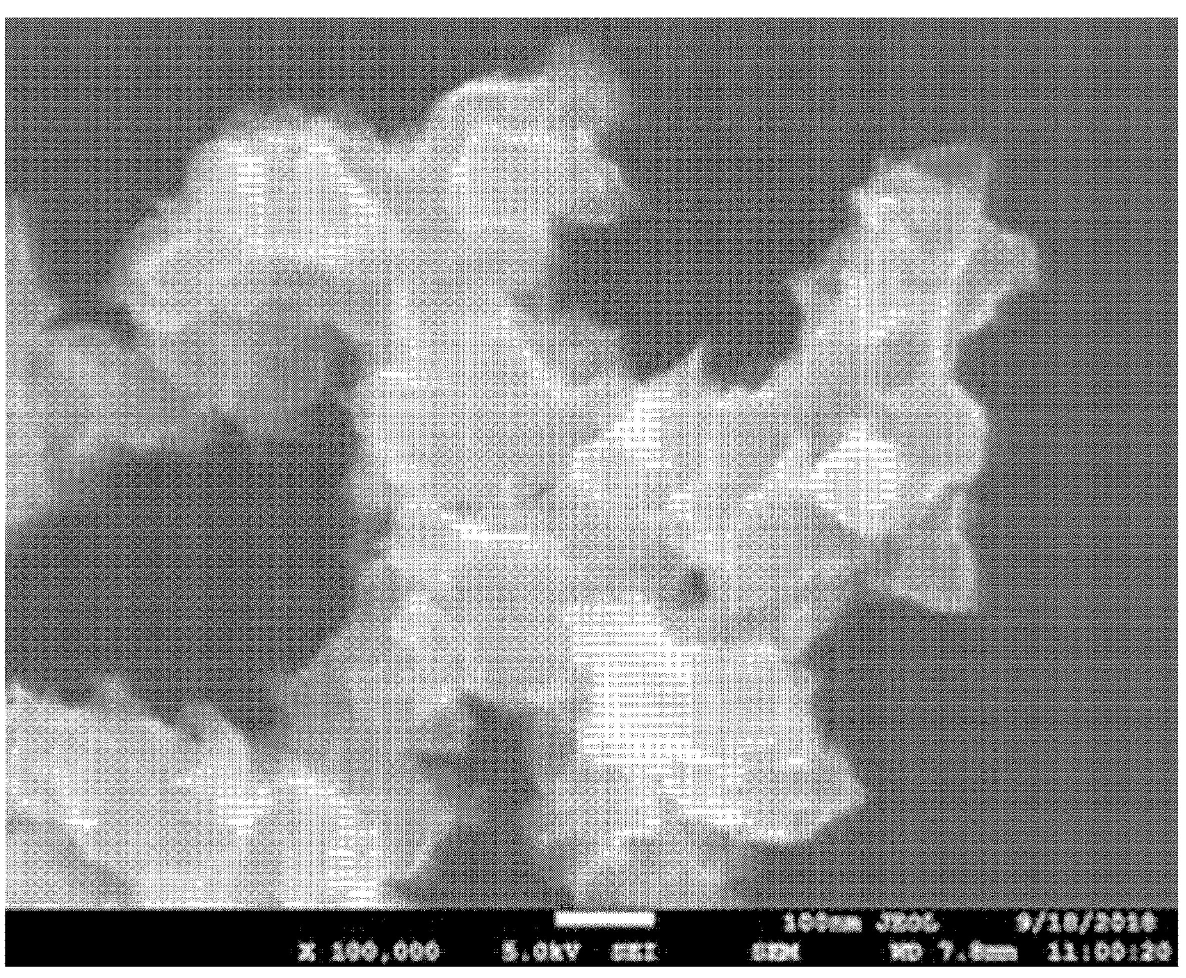
FIG. 5 is a scanning electron microscope (SEM) image of the carbon structure mentioned in the present disclosure.

When described in more detail, typical planar graphenes have a two-dimensional arrangement due to a small thickness compared to a width of the plane. Accordingly, most of conductive networks formed in an electrode are formed based on the two-dimensional arrangement. In contrast, referring to FIG. 4 and FIG. 5, the graphene sheets included in the carbon structure include a plurality of graphene sheets having a random arrangement. Specifically, the graphene sheets included in the carbon structure may include two or more graphene sheets having different plane directions (directions perpendicular to the planes of the graphene sheets). That is, the carbon structure may have a form having a three-dimensional arrangement which is formed by connecting graphene sheets arranged in various directions to each other, and, more specifically, the graphene sheets may be in the form of a chain that is arranged lengthways to have a predetermined length while having the three-dimensional arrangement. Thus, since electrically conductive and ion conductive networks in various directions may be effectively formed in the negative electrode active material layer, mobility of the lithium ions may be improved. The graphene sheets may also include a plurality of graphene sheets arranged in the same direction, but, in such a case, the graphene sheets also include a plurality of graphene sheets arranged in different directions.

The carbon structure may further include a connection portion connected to at least a part of the graphene sheets of the plurality of graphene sheets. In the present disclosure, during the preparation of the carbon structure, preliminary particles, such as carbon black, are ruptured by continuous oxidation to form the graphene sheets and a portion retaining its original shape without being ruptured may also be present. In this case, the portion retaining its shape may correspond to the connection portion. Thus, the connection portion may have a non-graphene shape, and the expression non-graphene shape, different from the above-described graphene sheet, may denote a lump shape having a thickness greater than the graphene sheet, and may more specifically be in the shape of a lump that is not completely ruptured.

A portion of each of the plurality of graphene sheets may be directly connected to each other. Alternatively, at least a portion of the graphene sheets of the plurality of graphene sheets may be connected to each other through the connection portion, and, specifically, at least a portion of each of the plurality of graphene sheets may be connected to the connection portion. The carbon structure may include both of the two connection methods.

Figure 3:
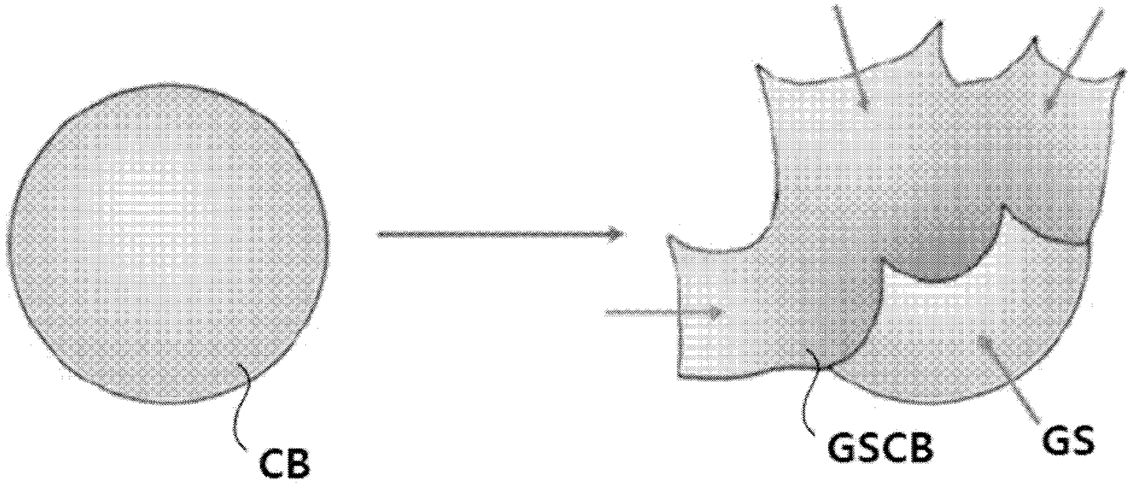
FIG. 3 is a schematic diagram for explaining a carbon structure mentioned in the present disclosure.

The carbon structure may be formed by modification of carbon black in the form of a near-spherical particle, for example, acetylene black, furnace black, thermal black, channel black, and lamp black, by an oxidation treatment. Referring to a schematic view of FIG. 3, a structure of carbon black (CB) may be modified by an oxidation treatment to form a particle (GSCB) including a plurality of graphene sheets (GS). In a case in which the carbon black is in the form of a secondary particle, a secondary particle, in which particles including the plurality of graphene sheets are aggregated, may be formed.

The graphene sheet may have an average thickness of 10 nm or less, particularly 0.34 nm to 10 nm, and more particularly 0.34 nm to 5 nm. In a case in which the average thickness of the graphene sheet satisfies the above range, since flexibility that is unique to the graphene sheet may be expressed, a surface contact due to the graphene sheet may be improved. Accordingly, a network for electrical conductivity and ionic conductivity is firmly formed, the storage and movement of the lithium ions may be significantly improved.

The graphene sheet may have an average lateral size of 10 nm to 500 nm, particularly 10 nm to 300 nm or less, and more particularly 10 nm to 200 nm, for example, 10 nm to 50 nm. The average lateral size of the graphene sheet may be controlled depending on a degree of heat treatment, and, for example, the lateral size of the graphene sheet may be controlled by further performing an additional heat treatment in an inert atmosphere after the oxidation treatment. In a case in which the lateral size of the graphene sheet satisfies the above range, since the network for electrical conductivity and ionic conductivity in various directions is firmly formed, the storage and movement of the lithium ions may be significantly improved.

The carbon structure may have an oxygen content of 1 wt % or more, particularly 1 wt % to 10 wt %, and more particularly 5 wt % to 10 wt % based on a total weight of the carbon structure. In a case in which the oxygen content of the carbon structure satisfies the above range, an anchoring site to which the silver nanoparticle may be effectively attached to the carbon structure may be formed by an appropriate surface oxygen functional group, and dispersion and arrangement of the silver nanoparticles may be effectively made. Accordingly, capacity and initial charge/discharge efficiency of the all-solid lithium secondary battery may be sufficiently improved even with a small amount of the silver nanoparticles.

The oxygen content may be achieved during the oxidation treatment of the carbon black. Specifically, an oxygen-containing functional group may be formed on a surface of the carbon structure by the oxidation treatment. The oxygen-containing functional group may be at least one selected from the group consisting of a carboxyl group, a hydroxy group, and a carbonyl group. After the oxidation treatment, the oxygen content may be further controlled by performing a heat treatment on the carbon structure in an inert atmosphere.

The carbon structure may have a higher degree of graphitization than the carbon black before the oxidation treatment. Specifically, since high structural stress caused by surface tension of the spherical carbon black may be partially eliminated due to the formation of the planar graphene sheets and structural defects caused by a curvature may be minimized to form a stable $sp^2$ structure, the degree of graphitization of the prepared conductive agent may be increased.

The carbon structure may have an $I_D/I_G$ of 2.0 or less, particularly 0.9 to 2.0, and more particularly 1.1 to 1.8, for example, 1.3 to 1.8 during Raman spectrum measurement. In the Raman spectrum, a G peak near 1590 $cm^{-1}$ is due to $E_{2g}$ vibration mode of $sp^2$ bonds of carbon, and a D peak near 1350 $cm^{-1}$ appears when there is a defect in the $sp^2$ bonds of carbon. That is, in a case in which the $I_D/I_G$ peak ratio is satisfied, it means that a relatively high degree of graphitization may be obtained, and, accordingly, when the carbon structure is used, since the network for electrical conductivity and ionic conductivity is firmly formed in the negative electrode active material layer, the storage and movement of the lithium ions may be significantly improved.

The carbon structure may have a value calculated by the following Equation 1 of 0.2 or less, particularly 0 to 0.20, and more particularly 0 to 0.15, for example, 0 to 0.1.

$$\frac{|b-a|}{a} \quad \text{[Equation 1]}$$

In Equation 1, a is a specific surface area ($m^2/g$) of the carbon structure which is measured by a nitrogen adsorption Brunauer-Emmett-Teller (BET) method, and b is an iodine adsorption value (mg/g) of the carbon structure. In a case in which the carbon structure includes a pore structure in the inside thereof or between the particles, small-sized nitrogen ($N_2$) molecules may be adsorbed a lot in the pores. In contrast, since iodine ($I_2$), as a relatively larger molecule, is difficult to enter into the pores in comparison to the nitrogen, the iodine adsorption value is not large. That is, when the pore structure is present, the value according to Equation 1 is increased. In other words, in the carbon structure, that the value according to Equation 1 is 0.2 or less means that the carbon structure does not include micropores or includes a small amount of the micropores. That is, in a case in which there are no micropores, since a degree of adsorption of iodine and a degree of adsorption of nitrogen are similar to each other, the value of Formula 1 is decreased. This means that the surface of the carbon structure is a free surface. Specifically, most of the carbon black is modified into a hollow structure by the oxidation treatment, and the structure is broken by the continuous oxidation treatment to form graphene sheets. In this case, the graphene sheets may be formed to open outward without forming the pore structure.

The carbon structure may have a specific surface area ($m^2/g$) measured by a nitrogen adsorption BET method of 200 $m^2/g$ or more, particularly 200 $m^2/g$ to 1,100 $m^2/g$, and more particularly 300 $m^2/g$ to 1,100 $m^2/g$, preferably, 500 $m^2/g$ to 900 $m^2/g$, for example, 800 $m^2/g$ to 900 $m^2/g$. In a case in which the above specific surface area range is satisfied, since the silver nanoparticles may be stably disposed on the surface of the carbon structure, the storage and movement of the lithium ions may be significantly improved.

The carbon structure may be included in an amount of wt % to 98 wt %, particularly 60 wt % to 95 wt %, and more particularly 70 wt % to 90 wt % in the negative electrode active material layer. When the above range is satisfied, since the mobility of the lithium ions may be effectively improved while a decrease in energy density of the all-solid lithium secondary battery is minimized, initial charge/discharge efficiency and life characteristics of the all-solid lithium secondary battery may be improved. Since the carbon structure is prepared by oxidizing carbon black composed of a plurality of primary particles, it has a unique shape including a plurality of graphene sheets which are generated by rupture of the spherical primary particles. Thus, the carbon structure may have both carbon black and graphene characteristics to some extent at the same time, and the carbon structure may have abundant surface oxygen functional groups during the oxidation process. Accordingly, the carbon structure may solve problems of low exfoliation and difficult dispersibility of conventional graphene based on characteristics of the carbon black, and may maintain high electrical conductivity properties of the thin graphene sheet. Therefore, when the carbon structure is used, aggregation of the carbon structure in the negative electrode active material layer may be suppressed, and, since the network for electrical conductivity and ionic conductivity is firmly formed, the storage and movement of the lithium ions may be significantly improved.

2) Silver Nanoparticle

Since the silver nanoparticle has lithiophilic properties, it may be easily alloyed with lithium ions. Accordingly, the silver nanoparticle may form an alloy with the lithium ions transferred from the positive electrode active material layer to promote the storage and diffusion of the lithium ions into the negative electrode active material layer.

The silver nanoparticle may include silver (Ag). Furthermore, the silver nanoparticle may further include at least one selected from the group consisting of gold, platinum, palladium, silicon, aluminum, bismuth, tin, indium, and zinc. Alternatively, the silver nanoparticle may be formed of silver. The silver nanoparticle may be in a solid phase.

The silver nanoparticle may be disposed on the surface of the carbon structure. Specifically, the silver nanoparticles may be formed by reducing silver ions in a silver ion solution on the surface of the carbon structure, and, accordingly, the silver nanoparticles may be disposed on the surface of the carbon structure. Alternatively, the silver nanoparticles may be disposed on the surface of the carbon structure by mixing powder of silver nanoparticles and the carbon structure in a powder state.

An average particle diameter of the silver nanoparticles may be in a range of 1 nm to 100 nm, particularly 1 nm to 50 nm, and more particularly 1 nm to 30 nm, for example, 1 nm to 5 nm. When the above range is satisfied, since the silver nanoparticles may be effectively dispersed in the negative electrode active material layer, the storage and diffusion of the lithium ions may be facilitated even if an amount of the silver nanoparticles is low. In addition, initial efficiency and life characteristics of the battery may be improved.

In the negative electrode active material layer, the silver nanoparticles may be included in an amount of 1 wt % to 40 wt % based on a total weight of the carbon structure and the silver nanoparticles, and may be specifically included in an amount of 3 wt % to 30 wt %, more specifically, 5 wt % to 20 wt %, for example, 7 wt % to 10 wt %. When the above range is satisfied, since the lithium ions transferred from the positive electrode active material layer may be effectively alloyed with the silver nanoparticles, electrochemical properties of the all-solid lithium secondary battery may be improved. Also, since the silver nanoparticles with a rather low silver content are used, the energy density and price competitiveness of the all-solid lithium secondary battery may be improved.

Particularly, that the silver nanoparticles may be used in an amount of 10 wt % or less, specifically, 7 wt % to 10 wt % is because the negative electrode active material layer includes the carbon structure. The lithium ions are alloyed with the silver nanoparticles having lithiophilic properties to promote the storage and diffusion of the lithium ions into the negative electrode, wherein, since the carbon structure described in the present disclosure particularly has the three-dimensionally formed robust network and the oxygen functional group on the surface thereof, the dispersion and arrangement of the silver nanoparticles may be effectively made. Accordingly, the capacity and initial charge/discharge efficiency of the all-solid lithium secondary battery may be sufficiently improved even with the small amount of the silver nanoparticles.

In the negative electrode active material layer, a weight ratio of the carbon structure to the silver nanoparticles may be in a range of 99:1 to 60:40, particularly 97:3 to 70:30, and more particularly 95:5 to 80:20. When the above range is satisfied, the capacity and initial charge/discharge efficiency of the all-solid lithium secondary battery may be more effectively improved.

A loading amount of the negative electrode active material layer may be in a range of 0.1 $mg/cm^2$ to 2.0 $mg/cm^2$, particularly 0.3 $mg/cm^2$ to 1.8 $mg/cm^2$, and more particularly $mg/cm^2$ to 1.6 $mg/cm^2$. When the above range is satisfied, an effect of improving the initial efficiency and lifetime of the battery may be maximized without reducing the energy density due to an increase in thickness of the negative electrode.

A thickness of the negative electrode active material layer may be in a range of 1 μm to 100 μm, particularly 1 μm to 50 μm, and more particularly 1 μm to 20 ∞m. When the above range is satisfied, the effect of improving the initial efficiency and lifetime of the battery may be maximized without reducing the energy density due to the increase in the thickness of the negative electrode.

3) Negative Electrode Binder

The negative electrode active material layer may further include a negative electrode binder. The negative electrode binder may include at least one selected from the group consisting of polyvinylidene fluoride (PVdF), polyvinyl alcohol (PVA), carboxymethyl cellulose (CMC), starch, hydroxypropyl cellulose, polyvinylpyrrolidone, polytetrafluoroethylene (PTFE), polytetrafluoroethylene, polyethylene, polypropylene, an ethylene-propylene-diene monomer (EPDM), a styrene-butadiene rubber (SBR), and a fluoro rubber.

The negative electrode binder may be included in an amount of 1 wt % to 20 wt %, particularly 1 wt % to 15 wt %, and more particularly 1 wt % to 10 wt % in the negative electrode active material layer. In a case in which the above range is satisfied, mechanical properties of the negative electrode may be improved while resistance of the negative electrode is maintained at a low level, and the storage and diffusion of the lithium ions may be further promoted.

In some cases, the negative electrode active material layer may further include at least one of lithium ion, lithium, and an alloy of lithium and silver nanoparticle. Specifically, if the all-solid lithium secondary battery is operated, at least one of lithium ion, lithium, and an alloy of lithium and silver nanoparticle may be present in the negative electrode active material layer by the lithium ions transferred from the positive electrode active material layer.

(2) Positive Electrode Active Material Layer

The all-solid lithium secondary battery may include a positive electrode active material layer. Specifically, the all-solid lithium secondary battery may include a positive electrode, and the positive electrode may include a positive electrode active material layer or may be composed of the positive electrode active material layer.

The positive electrode may include a positive electrode collector. The positive electrode collector is not particularly limited as long as it has high conductivity without causing adverse chemical changes in the positive electrode or the battery, and the positive electrode collector, for example, may include at least one selected from the group consisting of stainless steel, copper, aluminum, nickel, titanium, and fired carbon, and may specifically include aluminum. The positive electrode collector includes a carbon-based conductive agent and a binder, and may further include a primer layer which is coated on a surface of the positive electrode collector. Accordingly, electrical conductivity and a binding force between the positive electrode active material layer and the current collector may be significantly improved.

The positive electrode active material layer may be disposed on at least one surface of the positive electrode collector. Specifically, the positive electrode active material layer may be disposed on one surface or both surfaces of the positive electrode collector.

The positive electrode active material layer may include a positive electrode active material.

The positive electrode active material may include a layered compound, such as lithium cobalt oxide ($LiCoO_2$) or lithium nickel oxide ($LiNiO_2$), or a compound substituted with one or more transition metals; lithium manganese oxides including $Li_{1+x}Mn_{2-x}O_4$ (where, x is 0 to 0.33), $LiMnO_3$, $LiMn_2O_3$, $LiMn_2O_4$, and $LiMnO_2$; lithium copper oxide ($Li_2CuO_2$); vanadium oxides such as $LiV_3O_8$, $LiV_3O_4$, $V_2O_5$, and $Cu_2V_2O_7$; nickel (Ni)-site type lithium nickel oxide expressed by a chemical formula of $LiNi_{1-x}M_xO_2$ (where, M=cobalt (Co), manganese (Mn), aluminum (Al), copper (Cu), iron (Fe), phosphorus (P), magnesium (Mg), calcium (Ca), zirconium (Zr), titanium (Ti), ruthenium (Ru), niobium (Nb), tungsten (W), boron (B), silicon (Si), sodium (Na), potassium (K), molybdenum (Mo), vanadium (V), or gallium (Ga), and x=0.01 to 0.3); lithium manganese composite oxide expressed by a chemical formula of $LiMn_{1-x}M_xO_2$ (where, M=Co, nickel (Ni), Fe, chromium (Cr), zinc (Zn), or tantalum (Ta), and x=0.01 to 0.1) or $Li_2Mn_3MO_8$ (where, M=Fe, Co, Ni, Cu, or Zn); spinel structure lithium manganese composite oxides expressed by $LiNi_xMn_{2-x}O_4$; $LiMn_2O_4$ having a part of lithium (Li) being substituted with alkaline earth metal ions; a disulfide compound; $LiMn_xFe_{1-x}PO_4$ ($0 \le x \le 0.9$); or $Fe_2(MoO_4)_3$. However, the positive electrode active material is not limited thereto.

The positive electrode active material may include $Li_{1+x}M_yO_{2+z}$, wherein M may be at least one element selected from the group consisting of Ni, Co, Mn, Fe, P, Al, Mg, Ca, Zr, Zn, Ti, Ru, Nb, W, B, Si, Na, K, Mo, and V, and $0 \le x \le 5$, $0 < y \le 2$, and $0 \le z \le 2$. Specifically, $Li_{1+x}M_yO_{2+z}$ may include at least one selected from the group consisting of $LiCoO_2$, $LiNiO_2$, $LiMnO_2$, $Li[Ni_{0.5}Co_{0.3}Mn_{0.2}]O_2$, $Li[Ni_{0.6}Co_{0.2}Mn_{0.2}]O_2$, $Li[Ni_{0.7}Co_{0.1}Mn_{0.2}]O_2$, $Li[Ni_{0.8}Co_{0.1}Mn_{0.1}]O_2$, $Li[Ni_{0.9}Co_{0.05}Mn_{0.05}]O_2$, $LiMn_2O_4$, $LiFePO_4$, and $0.5Li_2MnO_3.0.5Li[Mn_{0.4}Ni_{0.3}Co_{0.3}]O_2$. Preferably, $Li_{1+x}M_yO_{2+z}$ may include any one of $Li[Ni_{0.6}Co_{0.2}Mn_{0.2}]O_2$, $Li[Ni_{0.7}Co_{0.1}Mn_{0.2}]O_2$, $Li[Ni_{0.8}Co_{0.1}Mn_{0.1}]O_2$, and $Li[Ni_{0.9}Co_{0.05}Mn_{0.05}]O_2$. Since the positive electrode active material includes $Li_{1+x}M_yO_{2+z}$, lithium may be sufficiently supplied to the negative electrode, and, since $Li_{1+x}M_yO_{2+z}$ exhibits electrochemical activity after the first cycle without causing degradation of overall battery performance, a battery capacity loss due to irreversible capacity of the negative electrode may be prevented. The $Li_{1+x}M_yO_{2+z}$ may be in the form of a secondary particle which is formed by bonding or assembling primary particles, or, alternatively, may be in the form of a single particle.

The positive electrode active material may be included in an amount of 50 wt % to 95 wt %, specifically, 60 wt % to 90 wt % in the positive electrode active material layer.

The positive electrode active material layer may further include a solid electrolyte.

The solid electrolyte may specifically include at least one selected from the group consisting of a polymer solid electrolyte, an oxide-based solid electrolyte, a sulfide-based solid electrolyte, and a halide-based solid electrolyte.

The polymer solid electrolyte may be a composite of a lithium salt and a polymer resin. Specifically, the polymer solid electrolyte may be formed by adding a polymer resin to a solvated lithium salt. Specifically, ionic conductivity of the polymer solid electrolyte may be in a range of about $1\times10^{-7}$ S/cm or more, preferably, about $1\times10^{-3}$ S/cm or more.

The polymer resin includes a polyether-based polymer, a polycarbonate-based polymer, an acrylate-based polymer, a polysiloxane-based polymer, a phosphazene-based polymer, a polyethylene derivative, an alkylene oxide derivative such as polyethylene oxide, a phosphoric acid ester polymer, a poly agitation lysine, a polyester sulfide, polyvinyl alcohol, polyvinylidene fluoride, or a polymer containing an ionic dissociation group, and may include one or more thereof. Also, the polymer solid electrolyte is a polymer resin, wherein examples thereof may be a branched copolymer obtained by copolymerizing an amorphous polymer, such as PMMA, polycarbonate, polysiloxane (pdms), and/or phosphazene, as a comonomer in a PEO (polyethylene oxide) main chain, a comb-like polymer resin, and a cross-linked polymer resin, and at least one thereof may be included.

The lithium salt is ionizable, wherein it may be expressed as $Li^+X^-$. An anion of the lithium salt is not particularly limited, but examples thereof may be $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The oxide-based solid electrolyte may include oxygen (O) and may have ion conductivity of a metal belonging to Group 1 or Group 2 of the periodic table. As a non-limiting example thereof, at least one selected from a LLTO-based compound, $Li_6La_2CaTa_2O_{12}$, $Li_6La_2ANb_2O_{12}$ (A is Ca or strontium (Sr)), $Li_2Nd_3TeSbO_{12}$, $Li_3BO_{2.5}N_{0.5}$, $Li_9SiAlO_8$, a LAGP-based compound, a LATP-based compound, $Li_{1+x}Ti_{2-x}Al_xSi_y(PO_4)_{3-y}$ (where, $0\leq x\leq 1$, $0\leq y\leq 1$), $LiAl_xZr_{2-x}(PO_4)_3$ (where, $0\leq x\leq 1$, $0\leq y\leq 1$), $LiTi_xZr_{2-x}(PO_4)_3$ (where, $0\leq x\leq 1$, $0\leq y\leq 1$), a LISICON-based compound, a LIPON-based compound, a perovskite-based compound, a NASICON-based compound, and a LLZO-based compound may be included. However, the oxide-based solid electrolyte is not particularly limited thereto.

The sulfide-based solid electrolyte contains sulfur (S) and has ion conductivity of a metal belonging to Group 1 or Group 2 of the periodic table, wherein the sulfide-based solid electrolyte may include Li—P—S-based glass or Li—P—S-based glass ceramic. Non-limiting examples of the sulfide-based solid electrolyte may be $Li_6PS_5Cl$, $Li_6PS_5Br$, $Li_6PS_5I$, $Li_2S—P_2S_5$, $Li_2S—LiI—P_2S_5$, $Li_2S—LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SnS$, $Li_2S—P_2S_5—Al_2S_3$, $Li_2S—GeS_2$, and $Li_2S—GeS_2—ZnS$, and the sulfide-based solid electrolyte may include at least one thereof. However, the sulfide-based solid electrolyte is not particularly limited thereto.

The halide-based solid electrolyte may include at least one of $Li_3YCl_6$ and $Li_3YBr_6$, but is not particularly limited thereto.

The solid electrolyte may be included in an amount of 5 wt % to 50 wt %, specifically, 10 wt % to 30 wt % in the positive electrode active material layer.

The positive electrode active material layer may further include a positive electrode conductive agent.

The positive electrode conductive agent is not particularly limited as long as it has conductivity without causing adverse chemical changes in the positive electrode or the battery, and, for example, the positive electrode conductive agent may include one selected from conductive materials such as: graphite such as natural graphite or artificial graphite; carbon black such as carbon black, acetylene black, Ketjen black, channel black, furnace black, lamp black, and thermal black; graphene; conductive fibers such as carbon nanofibers and carbon nanotubes; fluorocarbon; metal powder such as aluminum powder and nickel powder; conductive whiskers such as zinc oxide whiskers and potassium titanate whiskers; conductive metal oxide such as titanium oxide; and polyphenylene derivatives, or a mixture of two or more thereof.

The positive electrode conductive agent may be included in an amount of 1 wt % to 30 wt % in the positive electrode active material layer.

The positive electrode active material layer may further include a positive electrode binder.

The positive electrode binder is not particularly limited as long as it a component that assists in the binding between the positive electrode active material and the conductive agent and in the binding with the current collector, and may specifically include at least one selected from the group consisting of polyvinylidene fluoride (PVdF), polyvinyl alcohol (PVA), carboxymethyl cellulose (CMC), starch, hydroxypropyl cellulose, polyvinylpyrrolidone, polytetrafluoroethylene (PTFE), polytetrafluoroethylene, polyethylene, polypropylene, an ethylene-propylene-diene monomer (EPDM), a styrene-butadiene rubber (SBR), and a fluoro rubber.

The positive electrode binder may be included in an amount of 1 wt % to 30 wt % in the positive electrode active material layer.

The positive active material layer may include at least one additive such as an oxidation stabilizing additive, a reduction stabilizing additive, a flame retardant, a thermal stabilizer, and an antifogging agent, if necessary.

(3) Solid Electrolyte Layer

The all-solid lithium secondary battery may include a solid electrolyte layer.

The solid electrolyte layer may play an insulating role and may function as an ion conductive channel in the all-solid lithium secondary battery.

Figure 2:
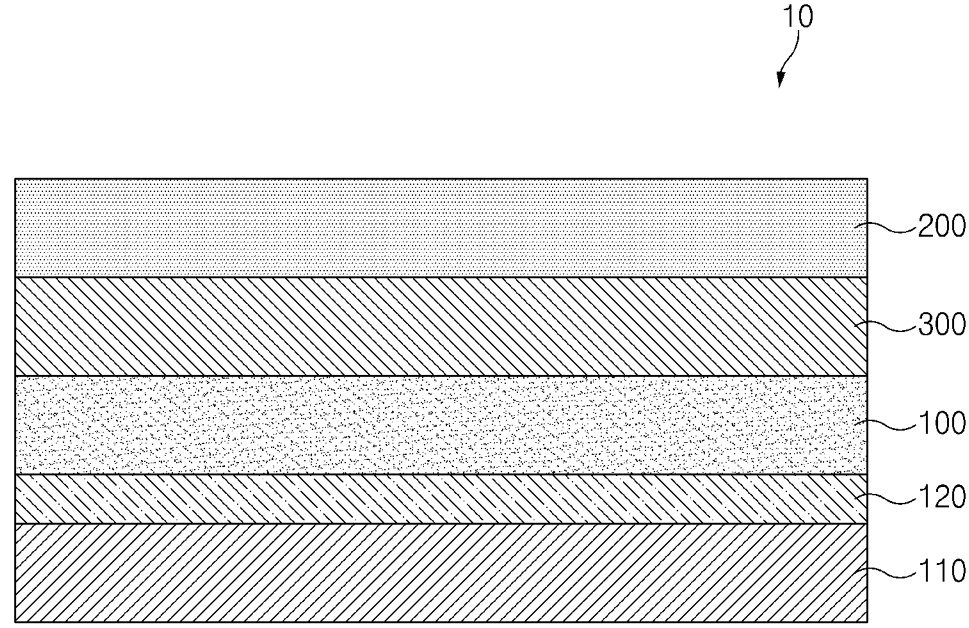
FIG. 2 is a schematic diagram for explaining an all-solid lithium secondary battery according to an embodiment of the present disclosure.

Referring to FIG. 2, the solid electrolyte layer 300 may be disposed between the negative electrode active material layer 100 and the positive electrode active material layer 200.

The solid electrolyte layer 300 includes the solid electrolyte. The solid electrolyte may specifically include at least one selected from the group consisting of a polymer solid electrolyte, an oxide-based solid electrolyte, and a sulfide-based solid electrolyte.

The polymer solid electrolyte may be a composite of a lithium salt and a polymer resin. Specifically, the polymer solid electrolyte may be formed by adding a polymer resin to a solvated lithium salt. Specifically, ionic conductivity of the polymer solid electrolyte may be in a range of about $1\times10^{-7}$ S/cm or more, preferably, about $1\times10^{-3}$ S/cm or more.

The polymer resin includes a polyether-based polymer, a polycarbonate-based polymer, an acrylate-based polymer, a polysiloxane-based polymer, a phosphazene-based polymer, a polyethylene derivative, an alkylene oxide derivative such as polyethylene oxide, a phosphoric acid ester polymer, a poly agitation lysine, a polyester sulfide, polyvinyl alcohol, polyvinylidene fluoride, or a polymer containing an ionic dissociation group, and may include one or more thereof. Also, the polymer solid electrolyte is a polymer resin, wherein examples thereof may be a branched copolymer obtained by copolymerizing an amorphous polymer, such as PMMA, polycarbonate, polysiloxane (pdms), and/or phosphazene, as a comonomer in a PEO (polyethylene oxide) main chain, a comb-like polymer resin, and a cross-linked polymer resin, and at least one thereof may be included.

The lithium salt is ionizable, wherein it may be expressed as $Li^+X^-$. An anion of the lithium salt is not particularly limited, but examples thereof may be $F^-$, $Cl^-$, $Br^-$, $I^-$, $NO_3^-$, $N(CN)_2^-$, $BF_4^-$, $ClP_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The oxide-based solid electrolyte may include oxygen (O) and may have ion conductivity of a metal belonging to Group 1 or Group 2 of the periodic table. As a non-limiting example thereof, at least one selected from a LLTO-based compound, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAlO_8$, a LAGP-based compound, a LATP-based compound, $Li_{1+x}Ti_{2-x}Al_xSi_y(PO_4)_{3-y}$ (where, 0≤x≤1, 0≤y≤1), $LiAl_xZr_{2-x}(PO_4)_3$ (where, 0≤x≤1, 0≤y≤1), $LiTi_xZr_{2-x}(PO_4)_3$ (where, 0≤x≤1, 0≤y≤1), a LISICON-based compound, a LIPON-based compound, a perovskite-based compound, a NASICON-based compound, and a LLZO-based compound may be included. However, the oxide-based solid electrolyte is not particularly limited thereto.

The sulfide-based solid electrolyte contains sulfur (S) and has ion conductivity of a metal belonging to Group 1 or Group 2 of the periodic table, wherein the sulfide-based solid electrolyte may include Li—P—S-based glass or Li—P—S-based glass ceramic. Non-limiting examples of the sulfide-based solid electrolyte may be $Li_6PS_5Cl$, $Li_6PS_5Br$, $Li_6PS_5I$, $Li_2S—P_2S_5$, $Li_2S—LiI—P_2S_5$, $Li_2S—LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SnS$, $Li_2S—P_2S_5—Al_2S_3$, $Li_2S—GeS_2$, and $Li_2S—GeS_2—ZnS$, and the sulfide-based solid electrolyte may include at least one thereof. However, the sulfide-based solid electrolyte is not particularly limited thereto.

The solid electrolyte layer may further include a binder for a solid electrolyte layer. The binder for a solid electrolyte layer may be introduced for binding between the solid electrolytes and binding between the solid electrolyte layer and battery elements (e.g., positive electrode, negative electrode, etc.) stacked on both surfaces thereof.

A material of the binder for a solid electrolyte layer is not particularly limited and may be appropriately selected within a range of components used as a binder of the solid electrolyte in the all-solid lithium secondary battery. Specifically, the binder for a solid electrolyte layer may include at least one selected from the group consisting of polyvinylidene fluoride (PVdF), polyvinyl alcohol (PVA), carboxymethyl cellulose (CMC), starch, hydroxypropyl cellulose, polyvinylpyrrolidone, polytetrafluoroethylene, polyethylene, polypropylene, an ethylene-propylene-diene monomer (EPDM), a styrene-butadiene rubber (SBR), a styrene-butadiene styrene block copolymer (SBS), a nitrile butadiene rubber (NBR), a fluoro rubber, and an acrylic binder.

A thickness of the solid electrolyte layer may be in a range of 10 μm to 90 μm, specifically, 20 μm to 80 μm, in consideration of ionic conductivity, physical strength, and energy density of a battery using the solid electrolyte layer. Also, tensile strength of the solid electrolyte layer may be in a range of 500 $kgf/cm^2$ to 2,000 $kgf/cm^2$. Furthermore, porosity of the solid electrolyte layer 300 may be 15% or less or about 10% or less.

The all-solid lithium secondary battery may further include a metal layer. Referring to FIG. 2, the all-solid lithium secondary battery 10 further includes a negative electrode collector 110, and may further include a metal layer 120 disposed between the negative electrode active material layer 100 and the negative electrode collector 110 in a charged state. The metal layer 120 may include lithium, and may specifically be formed of lithium.

The metal layer may mean a layer which is formed by storing the lithium ions transferred from the positive electrode active material layer on the negative electrode collector and the negative electrode active material layer through the negative electrode active material layer when the all-solid lithium secondary battery is charged. Thus, the metal layer appears clearly during charge.

The metal layer is observed during a discharge process, but, theoretically, may not be observed during complete discharge.

The present disclosure is meaningful in an all-solid lithium secondary battery, and may not have much meaning in a lithium secondary battery using a liquid electrolyte. For example, if the liquid electrolyte is used, since lithium (e.g., in the form of a metal layer) stored in the negative electrode may be continuously exposed to the liquid electrolyte, it may be difficult to completely store the lithium in the negative electrode.

Method of Preparing All-Solid Lithium Secondary Battery

A method of preparing an all-solid lithium secondary battery according to another embodiment of the present disclosure may include: a first step of forming dry mixed powder including a carbon structure and silver nanoparticles disposed on the carbon structure by reducing silver ions in a mixture of the silver ions and the carbon structure; and a second step of forming a negative electrode active material layer on a negative electrode collector through a negative electrode slurry including the dry mixed powder. Herein, the all-solid lithium secondary battery may be the same as the all-solid lithium secondary battery of the above-described embodiment. Also, the negative electrode active material layer may be the same as the negative electrode active material layer of the above-described embodiment.

(1) First Step

In the first step, dry mixed powder including the carbon structure and silver nanoparticles disposed on the carbon structure is formed. The dry mixed powder may be prepared by mixing silver nanoparticles in the form of powder and a carbon structure in the form of powder. Alternatively, the dry mixed powder may also be prepared by mixing a carbon structure in a silver ion solution and then reducing silver nano ions. As a method of reducing the silver nanoparticles, there are various methods such as a chemical reduction method, an electrochemical reduction method, a photochemical reduction method, a laser reduction method, an ultrasonic reduction method, and sputtering, but, preferably, a chemical reduction method using a polyol process or a microwave-assisted polyol method using microwave may be used.

In the polyol process, the silver ion solution may include a solvent and a stabilizer in addition to the silver ions. Ethylene glycol may be used as the solvent, and polyvinylpyrrolidone may be used as the stabilizer. However, the present disclosure is not necessarily limited thereto.

A molar concentration of the silver ions in the silver ion solution may be in a range of 1 mM to 1,000 mM, particularly 1 mM to 500 mM, and more particularly 1 mM to 300 mM. When the above molar concentration range is satisfied, since amount and size of the silver nanoparticles formed may be adjusted to an appropriate level, capacity, initial charge/discharge efficiency, and life characteristics of the all-solid lithium secondary battery may be effectively controlled.

In the first step, the reducing of the silver ions may include reacting the mixed solution at 100° C. to 500° C., and may specifically include reacting at 100° C. to 300° C. That is, the mixed solution may be reacted by performing a heat treatment at the above-described temperature. Accordingly, the silver ions may be appropriately reduced to obtain silver nanoparticles having a desirable size. Also, the silver nanoparticles may be disposed on a surface of the carbon structure in the above process.

The reducing of the silver ions may include adjusting a pH of the mixed solution. Specifically, the mixed solution may be adjusted to have an acidity of pH 8 to pH 14, more specifically, pH 9 to pH 13. Accordingly, the silver ions may be appropriately reduced to obtain silver nanoparticles having a desirable size.

Thereafter, the dry mixed powder may be obtained by washing and then drying a solid content of the mixed solution.

In the dry mixed powder, a weight ratio of the carbon structure to the silver nanoparticles may be in a range of 99:1 to 60:40, particularly 97:3 to 70:30, and more particularly 95:5 to 80:20. When the above range is satisfied, the capacity and initial charge/discharge efficiency of the all-solid lithium secondary battery may be more effectively improved.

(2) Second Step

In the second step, a negative electrode active material layer may be formed on a negative electrode collector through a negative electrode slurry including the dry mixed powder. The negative electrode slurry may include the dry mixed powder and a solvent for a negative electrode slurry.

The solvent for a negative electrode slurry may be selected from the group consisting of water and N-methyl pyrrolidone, but is not necessarily limited thereto.

The negative electrode slurry may further include a negative electrode binder. The negative electrode binder may be the same as the negative electrode binder of the above-described embodiment.

In the second step, the negative electrode active material layer may be formed by coating and drying the negative electrode slurry on the negative electrode collector. In some cases, in addition to the coating and drying processes, a pressurizing process may be added.

The method of preparing an all-solid lithium secondary battery may further include forming the carbon structure, before the first step.

The forming of the carbon structure includes preparing preliminary particles; and modifying the preliminary particles by an oxidation treatment, wherein the modifying of the preliminary particles by the oxidation treatment may include at least one of a) performing a first heat treatment of the preliminary particles at a temperature of 200° C. to 800° C. in an oxygen atmosphere or an air atmosphere; and b) reacting the preliminary particles with an acidic vapor at 120° C. to 300° C.

In the preparing of the preliminary particles, the preliminary particles may be carbon black. Specifically, the preliminary particles may be at least one selected from the group consisting of acetylene black, furnace black, thermal black, channel black, and lamp black. More specifically, the preliminary particles may be acetylene black which is produced at the highest temperature to basically have an excellent degree of graphitization.

The preparing of the preliminary particles may include pyrolysis of acetylene gas, and carbon black, for example, acetylene black may be formed by the pyrolysis. The acetylene gas may be high purity acetylene gas, and may specifically be acetylene gas with a purity of 95% or more, for example, 98% or more.

The pyrolysis of the acetylene gas may be performed at a temperature of 1,500° C. or more, particularly 1,500° C. to 2,200° C., and more particularly 1,500° C. to 2,000° C. In a case in which the temperature satisfies the above range, a degree of graphitization of the prepared preliminary particles may be high, and a degree of graphitization of the secondary particle thus prepared may also be high. Thus, the electrical conductivity of the conductive agent may be improved.

The preliminary particles may be carbon black, but, among them, acetylene black may be preferred in terms of the following aspect. The graphene sheets, which are included in the carbon structure, may be formed by modification of surfaces of the preliminary particles by an oxidation treatment. A surface of the acetylene black formed by the pyrolysis may have a high degree of graphitization. Thus, a structure of graphene sheet may be smoothly formed when the acetylene black is subjected to the oxidation treatment in comparison to a case where other carbon blacks inevitably including some oxygen functional groups on surfaces thereof are subject to the oxidation treatment.

The pyrolysis may be performed in such a manner that, after an internal temperature of a reaction furnace is adjusted to the above temperature range, acetylene gas is introduced into the reaction furnace and the pyrolysis is instantaneously performed. Also, in the process, air, oxygen, and $H_2O$ may be further added to control density of the conductive agent and an oxygen functional group, and a connection structure in the carbon structure may be controlled.

The modifying of the preliminary particles by the oxidation treatment may include at least one of a) performing a first heat treatment of the preliminary particles at a temperature of 200° C. to 800° C. in an oxygen atmosphere or an air atmosphere (step a); and b) reacting the preliminary particles with an acidic vapor at 120° C. to 300° C. (step b).

In step a, the oxygen atmosphere or the air atmosphere may be formed by introducing oxygen or air into the reaction furnace containing the preliminary particles. Specifically, the graphene sheet structure may be formed by an oxidation process in the reaction furnace according to the settings of appropriate flow amount and rate of oxygen or air, reaction temperature, and reaction time during the first heat treatment. Also, conditions of the oxidation process may vary depending on differences in density of the preliminary particles and an amount of the oxygen functional group.

In step a, the first heat treatment may be performed by controlling a temperature of the reaction furnace in the reaction furnace containing the preliminary particles. The first heat treatment may be performed at a heat treatment temperature of 200° C. to 800° C., and may specifically be performed at a heat treatment temperature of 200° C. to 450° C. In a case in which the heat treatment temperature satisfies the above range, excessively rapid oxidation of the preliminary particles may be prevented, and a graphene sheet having a desired size may be formed. The first heat treatment may be performed for 1 hour to 50 hours.

In step b, the preliminary particles may react with an acidic vapor to be oxidized to form graphene sheets. Specifically, the acidic vapor may be a vapor derived from an acidic solution such as HCl and $HNO_3$. A temperature of the acidic vapor reacting with the preliminary particles may be in a range of 120° C. to 300° C.

After the modifying of the preliminary particles by the oxidation treatment, a second heat treatment process in an inert atmosphere may be further performed to increase the size of the graphene sheet formed. Specifically, the method of preparing a carbon structure may further include performing a second heat treatment of the preliminary particles modified by the oxidation treatment at a temperature of 500° C. or more in an inert atmosphere, after the modifying of the preliminary particles by the oxidation treatment. In this case, the inert atmosphere may be formed by vacuum or any one gas selected from the group consisting of helium, argon, and nitrogen. The second heat treatment temperature may be 500° C. or more, particularly 500° C. to 2,800° C., and more particularly 600° C. to 1,600° C.

A mechanism of forming the carbon structure described in the present disclosure may be as follows. During the preparation of the carbon structure, an oxidation treatment is performed on spherical or chain-type carbon black, in which spherical primary particles have an average diameter of 50 nm or less and the primary particles share the structure, for example, acetylene black under specific conditions. In this case, penetration and oxidation reaction of an oxidizing agent, such as oxygen and acidic vapor, occur from a defect portion such as a grain boundary or a dislocation present in a unit microstructure of the carbon black. When the oxidation treatment is performed for a predetermined time in the temperature range described in the preparation method, the oxidizing agent penetrates into the internal microstructure of the carbon black to cause oxidation. In this case, in order to relieve structural stress of the microstructure of the primary particle which has a radius of curvature greater than a radius of curvature of a surface of the spherical primary particle, an oxidation reaction occurs rapidly in the primary particle. Accordingly, internal carbon atoms are oxidized to gases such as CO, $CO_2$, and $CH_4$, and the primary particles are converted to a hollow type. Most of the structural stresses remaining in the spherical primary particles are also relieved while a surface structure of the hollow-type primary particles is also destroyed by the continuous oxidation treatment, and graphene sheets appear in this process. Thus, the modification process may be accelerated as the average diameter of the carbon black, as the primary particle, is decreased, internal density of the particle is decreased, and an amount of the oxygen functional group in the primary particle is greater than that on the surface of the primary particle. Also, step a is more desirable than step b in terms of the fact that step a may further accelerate the modification process.

Also, the present disclosure provides a battery module including the all-solid lithium secondary battery as a unit cell, a battery pack including the battery module, and a device including the battery pack as a power source. In this case, specific examples of the device may be a power tool that is operated by being powered by an electric motor; electric cars including an electric vehicle (EV), a hybrid electric vehicle (HEV), and a plug-in hybrid electric vehicle (PHEV); electric two-wheeled vehicles including an electric bicycle (E-bike) and an electric scooter (E-scooter); an electric golf cart; urban air mobility (UAM); and a power storage system, but the device is not limited thereto.

Hereinafter, the present disclosure will be described in more detail, according to examples, but the following examples are merely presented to exemplify the present disclosure, and the scope of the present disclosure is not limited thereto.

EXAMPLES AND COMPARATIVE EXAMPLES

Preparation Example 1: Formation of Carbon Structure (1) Formation of Preliminary Particles (Acetylene Black)

Acetylene black was formed by pyrolysis of acetylene gas having a purity of 98% by instantaneously injecting the acetylene gas into a reaction furnace with an internal temperature of 2,000° C.

(2) Preparation of Secondary Particle

Figure 6:
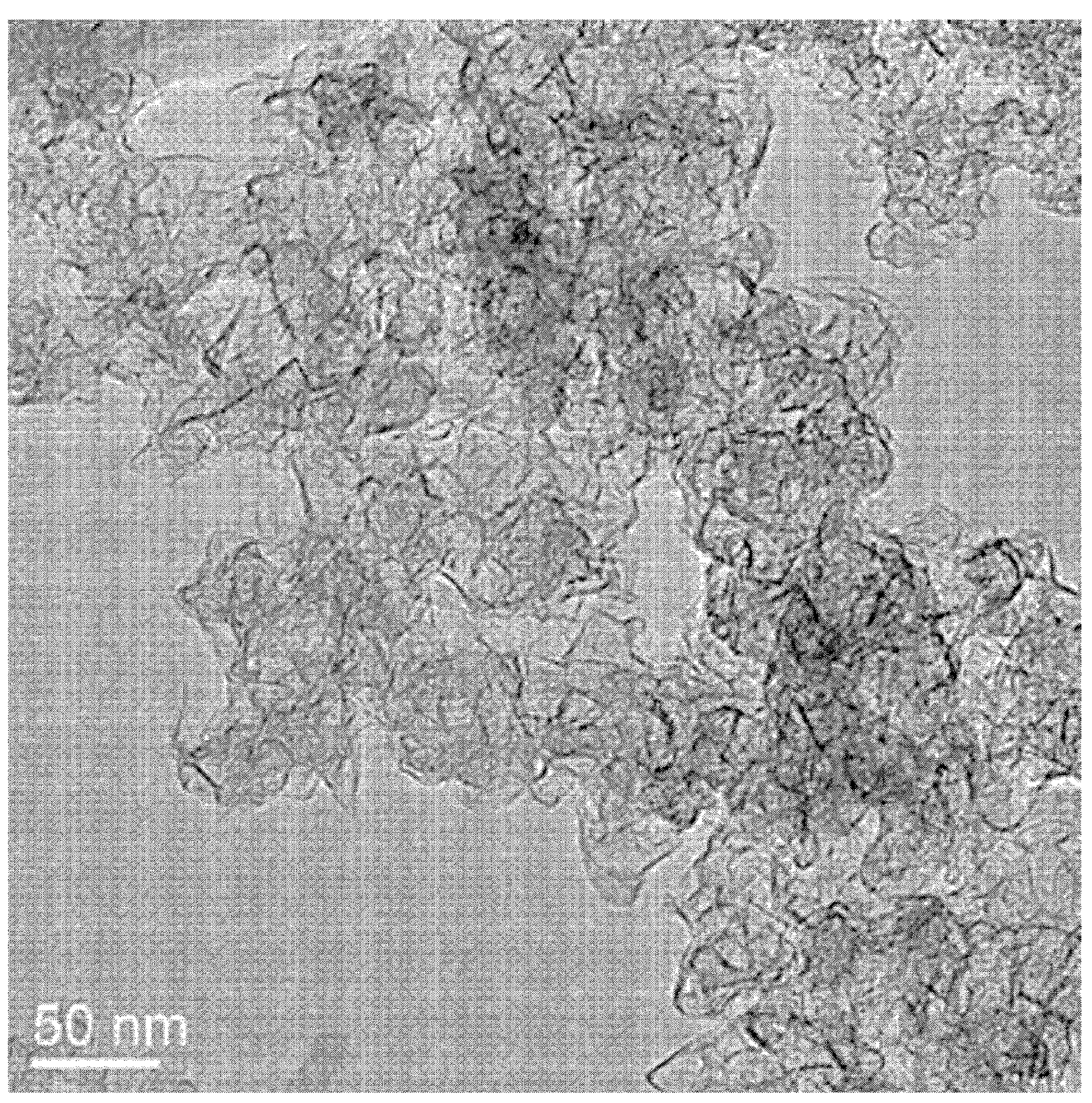
FIG. 6 is a TEM image of a carbon structure used in Example 1 of the present disclosure.

Subsequently, the internal temperature of the reaction furnace containing the acetylene black was set to 250° C., and an oxidation treatment was then performed for 30 hours while introducing oxygen. As a result, a carbon structure, which included a chain shape in which a plurality of graphene sheets having an average lateral size of about 41 nm were connected to each other, wherein the graphene sheets included a plurality of graphene sheets arranged in different directions, was obtained. (see FIGS. 5 and 6)

Preparation Example 2: Preparation of Carbon Structure

Figure 7:
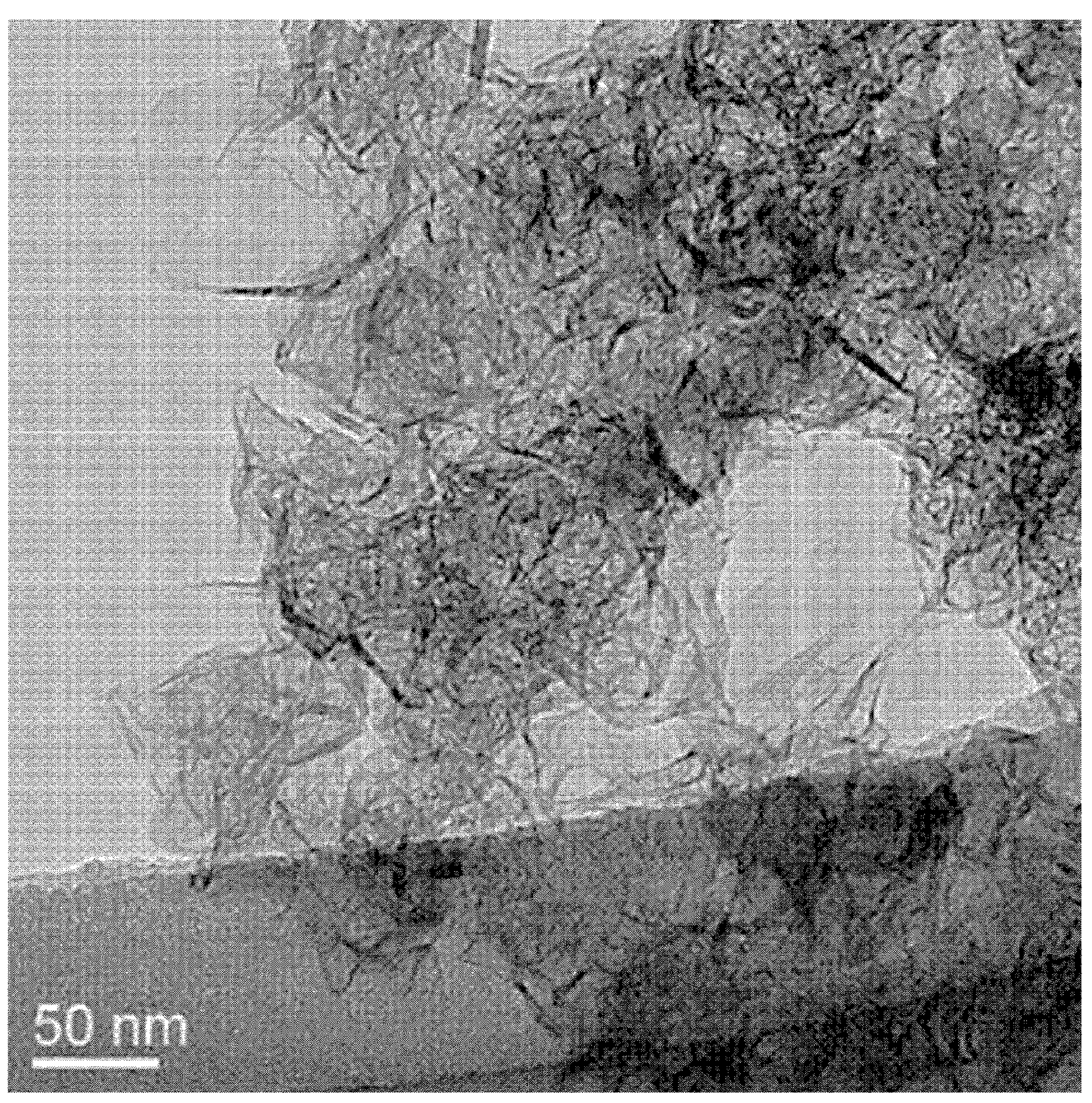
FIG. 7 is a TEM image of a carbon structure used in Example 2 of the present disclosure.

An additional heat treatment was performed on the carbon structure used in Preparation Example 1 at 900° C. for 1 hour in an inert atmosphere to obtain a carbon structure which included a chain shape in which a plurality of graphene sheets having an average lateral size of about 65 nm were connected to each other, wherein the graphene sheets included a plurality of graphene sheets arranged in different directions (see FIG. 7).

Figure 8:
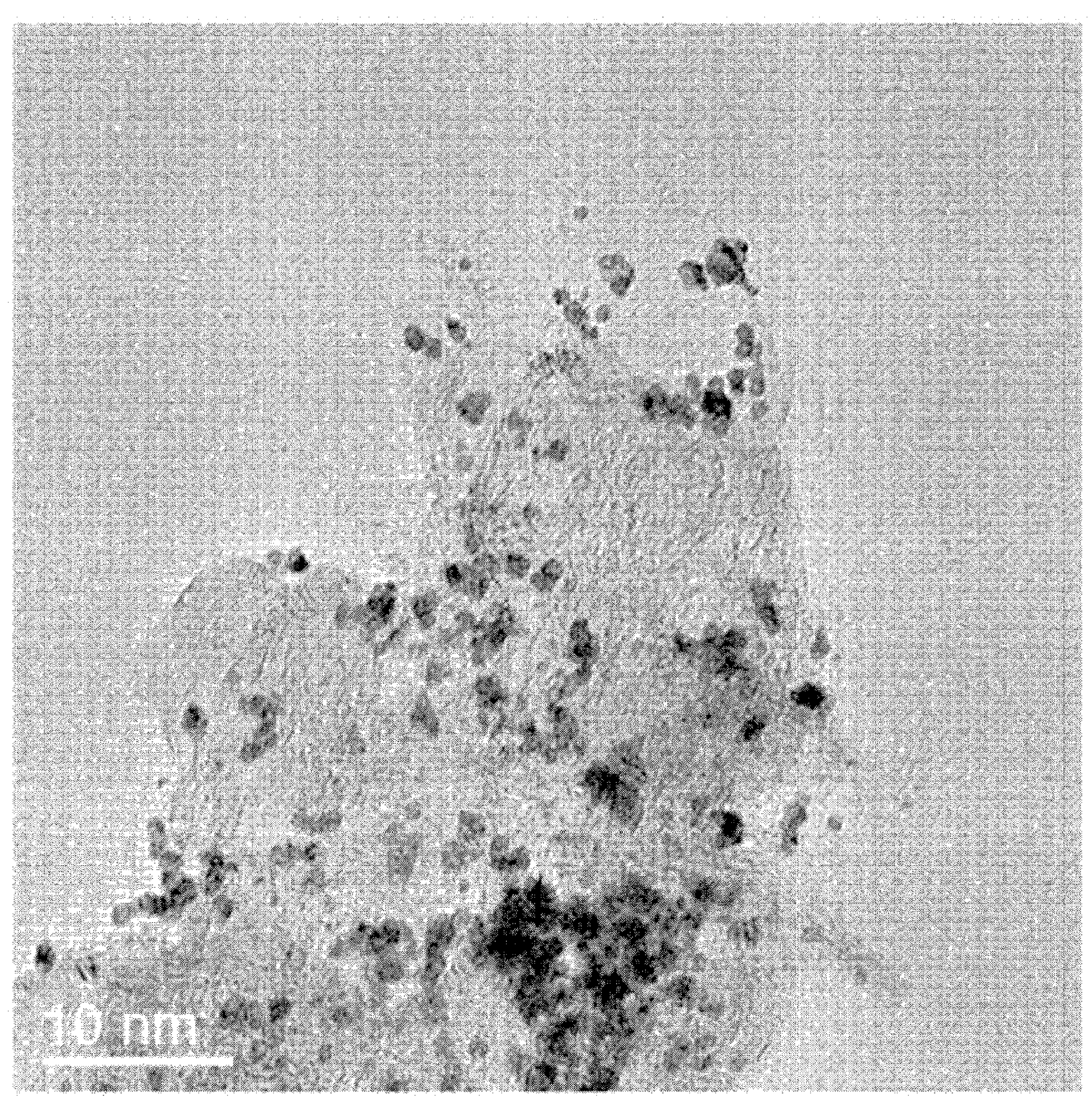
FIG. 8 is a TEM image of the carbon structure used in Example 1 of the present disclosure and silver nanoparticles disposed on the carbon structure.

Example 1: Preparation of All-Solid Lithium Secondary Battery (1) Negative Electrode Preparation A mixed solution was prepared by mixing the carbon structure, $AgNO_3$, and polyvinylpyrrolidone in an ethylene glycol solvent, adjusting pH to satisfy a range of 8 to 14 through NaOH pellets, and then stirring for 24 hours. Heating and cooling were repeated by treating the mixed solution, which had been subjected to Ar bubbling with an ultrasonic device, in time units of 10 seconds, 20 seconds, 30 seconds, 1 minute, 2 minutes, and 5 minutes using a continuous wave mode (2.45 GHz, 500 W) of a microwave reactor (LG Electronics). Silver ions were reduced through this so that silver nanoparticles were disposed on the carbon structure. Thereafter, filtering and washing were performed using an acetone solution and drying was performed in a vacuum oven at 100° C. for 24 hours to obtain dry mixed powder including carbon structure and silver nanoparticles disposed on the carbon structure (see FIG. 8). An amount of the silver nanoparticles loaded was 10 wt %, and an average particle diameter of the silver nanoparticles was 1 nm.

The dry mixed powder and polyvinylidene fluoride were added to N-methyl pyrrolidone (NMP), as a solvent, and stirred to form a negative electrode slurry. In the negative electrode slurry, a weight ratio of the dry mixed powder to the polyvinylidene fluoride was 93:7.

The negative electrode slurry was applied to a stainless steel current collector (thickness: 15 μm), dried in a vacuum oven at 100° C. for 12 hours, and then subjected to a rolling process using a roll press to prepare a negative electrode including the stainless steel current collector and a negative electrode active material layer disposed on the stainless steel current collector. A thickness of the negative electrode active material layer was 10 μm, and a loading amount of the negative electrode active material layer was 1 mg/cm$^2$.

(2) Positive Electrode Preparation $Li[Ni_{0.82}Co_{0.14}Mn_{0.04}]O_2$ as a positive electrode active material, $Li_6PS_6Cl$ as a solid electrolyte, carbon nanofibers (VGCF, Showa Denko) as a conductive agent, and polytetrafluoroethylene, as a binder, were sequentially added to a container at a weight ratio of 77:20:1:2. A positive electrode mixture was prepared by mixing 10 times for 30 seconds at 10,000 RPM using a lab blender whenever each component was added. High shear mixing was performed on the mixture for 5 minutes by applying a shear force at 100 rpm at 100° C. using a twin screw kneader (LG Electronics) to prepare a positive electrode mixture. A free-standing film having a thickness of 200 μm was prepared from the positive electrode mixture by using two roll mil equipment (Inoue Mfg., Inc.) at 100° C. Thereafter, the film was disposed on one side of a primer-coated aluminum current collector (thickness: 20 μm), and the film was bonded to the current collector using a lamination roll maintained at 120° C. to prepare a positive electrode.

(3) Preparation of All-Solid Lithium Secondary Battery

After $Li_6PS_6Cl$ solid electrolyte and nitrile butadiene rubber (NBR) were mixed with xylene as a solvent, the mixture was mixed together with zirconia balls at 2,000 RPM for 1 minute 10 times using a Thinky Mixer to prepare a solid electrolyte slurry. The solid electrolyte slurry was coated on a PET film as a release paper, and dried in a vacuum oven at 45° C. for 6 hours to prepare a solid electrolyte layer. In this case, a weight ratio of the $Li_6PS_6Cl$ solid electrolyte to the nitrile butadiene rubber (NBR) was 95:5 in wt %, and a thickness of the prepared solid electrolyte layer was 100 μm.

After an assembly was prepared by disposing the solid electrolyte layer between the negative electrode and the positive electrode, the assembly was put in a pouch and sealed. Thereafter, after the pouch was fixed on an Al plate, the pouch was pressurized at 500 MPa for 30 minutes using an isostatic press (Warm Isostatic Pressure) to prepare an all-solid lithium secondary battery of Example 1.

Examples 2 to 6: Preparation of All-Solid Lithium Secondary Batteries

All-solid lithium secondary batteries were prepared in the same manner as in Example 1 except that a weight ratio of the carbon structure, $AgNO_3$, and polyvinylidenepyrrolidone, a pH value, and reaction conditions in the microwave reactor were controlled to adjust amount and average particle diameter of silver nanoparticles as shown in Table 1.

Figure 9:
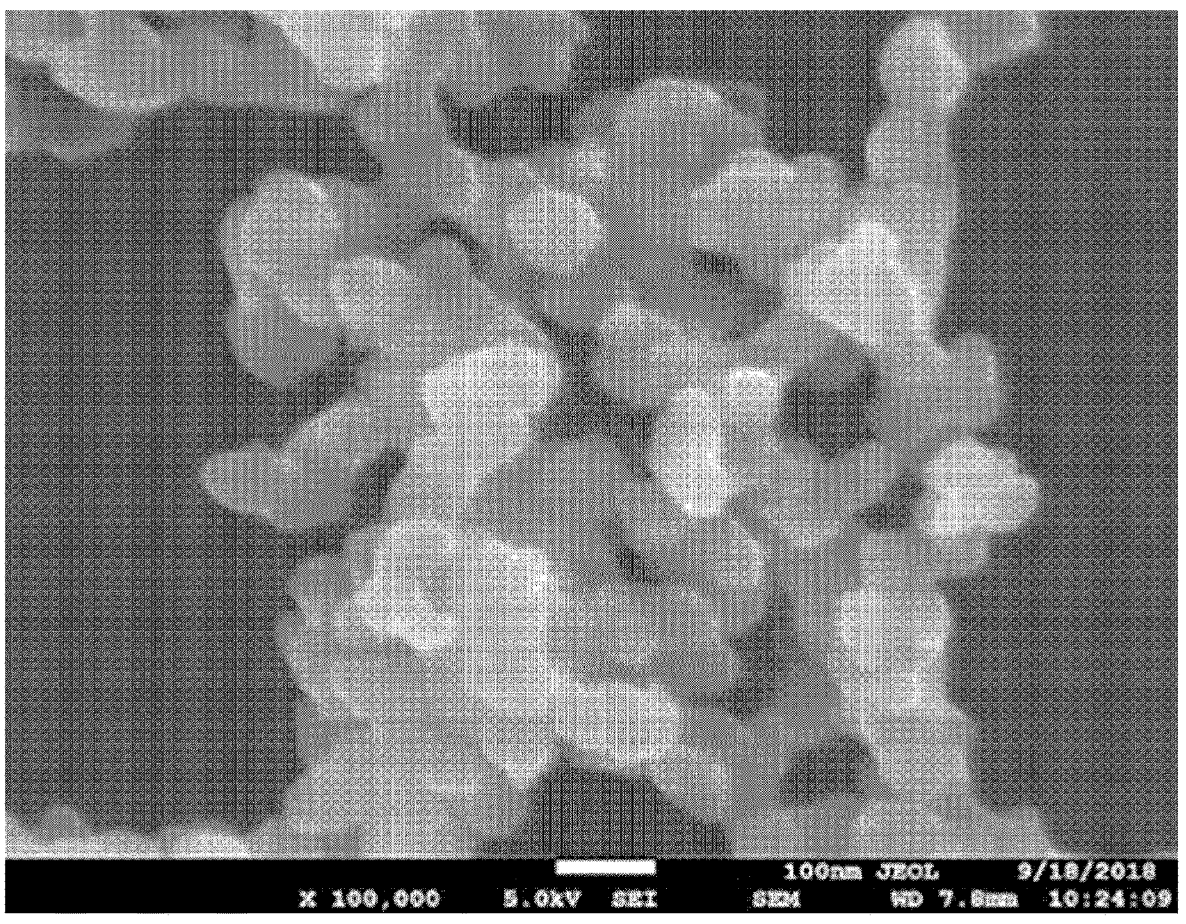
FIG. 9 is an SEM image of acetylene black used in Comparative Example 1 of the present disclosure.

Comparative Examples 1 and 2: Preparation of All-Solid Lithium Secondary Batteries (1) Negative Electrode Preparation All-solid lithium secondary batteries were prepared in the same manner as in Example 1 except that carbon black (PRINTEX, Orion Engineered Carbons) (see FIG. 9) was used instead of the carbon structure in Example 1, and a weight ratio of the carbon black, $AgNO_3$, and polyvinylidenepyrrolidone, a pH value, and reaction conditions in the microwave reactor were controlled to adjust amount and average particle diameter of silver nanoparticles as shown in Table 1.

Comparative Example 3: Preparation of Lithium Secondary Battery (1) Negative Electrode and Positive Electrode Preparation Negative electrode and positive electrode were prepared in the same manner as in Example 1.

(3) Preparation of Lithium Secondary Battery

Thereafter, after a monocell was prepared by disposing a 15 μm thick polyethylene-based separator between the prepared negative electrode and positive electrode, an electrolyte solution (ethylene carbonate (EC)/ethylmethyl carbonate (EMC)=½ (volume ratio), lithium hexafluorophosphate ($LiPF_6$ 1 mol)) was injected into the monocell to prepare a lithium secondary battery.

Comparative Example 4: Preparation of Lithium Secondary Battery

A lithium secondary battery was prepared in the same manner as in Comparative Example 3 except that a weight ratio of the carbon structure, $AgNO_3$, and polyvinylidenepyrrolidone, a pH value, and reaction conditions in the microwave reactor were controlled to adjust amount and average particle diameter of silver nanoparticles as shown in Table 1.

TABLE 1

| | Carbon material type | Silver nanoparticles amount (wt %) | Silver nanoparticle size (nm) | Whether or not a solid electrolyte layer was used |
|---|---|---|---|---|
| Example 1 | Carbon structure of Preparation Example 1 | 10 | 1 | ○ |
| Example 2 | Carbon structure of Preparation Example 1 | 5 | 1 | ○ |
| Example 3 | Carbon structure of Preparation Example 1 | 20 | 2.5 | ○ |
| Example 4 | Carbon structure of Preparation Example 1 | 30 | 5 | ○ |

TABLE 1-continued

| | Carbon material type | Silver nanoparticles amount (wt %) | Silver nanoparticle size (nm) | Whether or not a solid electrolyte layer was used |
|---|---|---|---|---|
| Example 5 | Carbon structure of Preparation Example 1 | 10 | 10 | ○ |
| Example 6 | Carbon structure of Preparation Example 2 | 10 | 1 | ○ |
| Comparative Example 1 | Carbon black | 10 | 5 | ○ |
| Comparative Example 2 | Carbon black | 10 | 10 | ○ |
| Comparative Example 3 | Carbon structure of Preparation Example 1 | 10 | 1 | X |
| Comparative Example 4 | Carbon structure of Preparation Example 1 | 10 | 10 | X |

TABLE 2

| Carbon material type | Average thickness of graphene sheets in the carbon structure (nm) | Average lateral size of graphene sheets in the carbon structure (nm) | Carbon structure specific surface area ($m^2$/g) | Oxygen content in the carbon structure (wt %) | $I_D/I_G$ of the carbon structure |
|---|---|---|---|---|---|
| Carbon structure of Preparation Example 1 | 4 | 41 | 825 | 8.9 | 1.42 |
| Carbon structure of Preparation Example 2 | 7 | 78 | 709 | 3.1 | 1.26 |

The "specific surface area" was measured by a Brunauer-Emmett-Teller (BET) method, wherein, specifically, the specific surface area was calculated from a nitrogen gas adsorption amount at a liquid nitrogen temperature (77K) using BELSORP-mini II by Bell Japan Inc. The $I_D/I_G$ (ratio) was measured from a wavelength-peak graph during Raman spectrum measurement. Specifically, after fitting the graph by setting a base line so that a D peak and a G peak may be distinguished, the $I_D/I_G$ was identified by dividing D peak intensity by G peak intensity (using built-in software, NRS-2000B, Jasco).

The average thickness of the graphene sheets in the carbon structure corresponds to an average value of thicknesses of 100 graphene sheets when the negative electrode active material layer was observed at ×1,000,000 magnification with a transmission electron microscope (TEM).

The average lateral size of the graphene sheet in the carbon structure corresponds to an average value of lateral sizes of 100 graphene sheets when the negative electrode active material layer was observed at ×250,000 magnification with a TEM. Herein, the lateral size denoted the longest length when assuming a line from one point to another point in one graphene sheet.

The oxygen content of the carbon structure was measured by carbon (C), hydrogen (H), oxygen (O), and nitrogen (N) elemental analysis.

The average particle diameter of the silver nanoparticles corresponds to an average value of particle diameters of 100 silver nanoparticles when the carbon structure including the silver nanoparticles of the negative electrode active material layer was observed at ×1,000,000 magnification with a TEM.

The amount of the silver nanoparticles means an amount based on a total weight of the carbon structure and the silver nanoparticles in the negative electrode active material layer.

Experimental Example 1: Initial Charge/Discharge Efficiency Evaluation

Each of the batteries of the examples and the comparative examples was mounted on a pressure jig, and bolts/nuts located at square corners were tightened with the same pressure of 1 N·m to prepare a monocell. When the monocell was charged once and discharged once at 60° C. under the following conditions, initial charge/discharge efficiency was evaluated as a ratio of one-time charge capacity to one-time discharge capacity (see Table 3).

Charging conditions: CC charged at 0.1 C to 4.25 V, thereafter CV charged at 4.25 V 0.05 C cut-off Discharging conditions: CC discharged at 0.1 C to 3.0 V

Experimental Example 2: Capacity Retention Evaluation

After charging and discharging each of the batteries of the examples and the comparative examples at 60° C. under the following conditions, a capacity retention (%) in a $50^{th}$ cycle was evaluated. Discharge capacity in the first charge/discharge cycle was set as 100%.

Charging conditions: CC charged at 0.5 C to 4.25 V, 0.5 C cut-off

Discharging conditions: CC discharged at 0.33 C to 3.0 V

TABLE 3

| | Initial charge and discharge efficiency (%) | 0.5 C/0.5 C 60° C. capacity retention (%, @50 cycle) |
|---|---|---|
| Example 1 | 97.7 | 97.8 |
| Example 2 | 96.9 | 96.4 |
| Example 3 | 96.1 | 95.6 |
| Example 4 | 95.3 | 94.2 |
| Example 5 | 97.2 | 97.3 |
| Example 6 | 96.5 | 96.1 |
| Comparative Example 1 | 71.4 | 85.6 |
| Comparative Example 2 | 63.8 | 82.4 |
| Comparative Example 3 | 94.6 | 73.5 |
| Comparative Example 4 | 95.2 | 74.3 |

The invention claimed is:

1. An all-solid lithium secondary battery, comprising:

a positive electrode active material layer;

a negative electrode active material layer; and a solid electrolyte layer disposed between the positive electrode active material layer and the negative electrode active material layer, wherein the negative electrode active material layer comprises a carbon structure and silver nanoparticles, wherein the carbon structure comprises a structure in which a plurality of graphene sheets are connected to each other, wherein the plurality of graphene sheets are interconnected to form a secondary particle in the form of a chain, wherein the graphene sheets have an average lateral size of 10 nm to 500 nm, and wherein the plurality of graphene sheets comprise two or more graphene sheets having different plane directions.

2. The all-solid lithium secondary battery of claim 1, wherein the silver nanoparticles are disposed on a surface of the carbon structure.

3. The all-solid lithium secondary battery of claim 1, wherein, in the carbon structure, each of the plurality of the graphene sheets has an average thickness of 0.34 nm to 10 nm.

4. The all-solid lithium secondary battery of claim 1, wherein, in Raman spectrum measurement of the carbon structure, the carbon structure has an $I_D/I_G$ of 0.9 to 2.0.

5. The all-solid lithium secondary battery of claim 1, wherein the carbon structure has a specific surface area of 200 $m^2/g$ to 1,100 $m^2/g$.

6. The all-solid lithium secondary battery of claim 1, wherein an oxygen content of the carbon structure is in a range of 1 wt % to 10 wt % based on a total weight of the carbon structure.

7. The all-solid lithium secondary battery of claim 1, wherein the carbon structure is included in an amount of 50 wt % to 98 wt % in the negative electrode active material layer.

8. The all-solid lithium secondary battery of claim 1, wherein the silver nanoparticles have an average particle diameter of 1 nm to 100 nm.

9. The all-solid lithium secondary battery of claim 1, wherein, in the negative electrode active material layer, the silver nanoparticles are included in an amount of 1 wt % to 40 wt % based on a total weight of the carbon structure and the silver nanoparticles.

10. The all-solid lithium secondary battery of claim 1, wherein a weight ratio of the carbon structure to the silver nanoparticles is in a range of 99:1 to 60:40.

11. The all-solid lithium secondary battery of claim 1, wherein the negative electrode active material layer further comprises a negative electrode binder.

12. The all-solid lithium secondary battery of claim 1, wherein the negative electrode active material layer has a thickness of 1 μm to 100 μm.

13. The all-solid lithium secondary battery of claim 1, further comprising:

a negative electrode collector; and a metal layer disposed between the negative electrode active material layer and the negative electrode collector in a charged state, wherein the metal layer comprises lithium.

14. A method of preparing the all-solid lithium secondary battery of claim 1, the method comprising:

a first step of forming a dry mixed powder including the carbon structure and the silver nanoparticles disposed on the carbon structure by reducing silver ions in a mixture of the silver ions and the carbon structure; and a second step of forming the negative electrode active material layer on a negative electrode collector through a negative electrode mixture including the dry mixed powder.

* * * * *